US012347234B2

(12) United States Patent
Chen et al.

(10) Patent No.: US 12,347,234 B2
(45) Date of Patent: Jul. 1, 2025

(54) FACE IMAGE VERIFICATION METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Yu Chen, Shenzhen (CN); Yang Yu, Shenzhen (CN); Zhuo Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 431 days.

(21) Appl. No.: 18/071,460

(22) Filed: Nov. 29, 2022

(65) Prior Publication Data
US 2023/0091865 A1 Mar. 23, 2023

Related U.S. Application Data

(63) Continuation of application No. PCT/CN2022/073999, filed on Jan. 26, 2022.

(30) Foreign Application Priority Data

Feb. 1, 2021 (CN) .......................... 202110138138.8

(51) Int. Cl.
*G06V 40/16* (2022.01)
*G06F 21/32* (2013.01)
(Continued)

(52) U.S. Cl.
CPC ............ *G06V 40/172* (2022.01); *G06F 21/32* (2013.01); *G06F 21/44* (2013.01); *G06V 10/30* (2022.01); *G06V 40/161* (2022.01)

(58) Field of Classification Search
CPC .... G06V 40/172; G06V 10/30; G06V 40/161; G06V 40/40; G06F 21/32; G06F 21/44; G06F 2221/2115
See application file for complete search history.

(56) References Cited

U.S. PATENT DOCUMENTS 9,525,866 B1   12/2016   Charlton et al.

FOREIGN PATENT DOCUMENTS

CN     105303449 A     2/2016
CN     108154080 A     6/2018
(Continued)

OTHER PUBLICATIONS

Tencent Technology, ISR, PCT/CN2022/073999, Apr. 1, 2022, 2 pgs.

(Continued)

*Primary Examiner* — Juan M Guillermety
(74) *Attorney, Agent, or Firm* — Morgan, Lewis & Bockius LLP

(57) ABSTRACT

Embodiments of this application provide a face image verification method performed by an electronic device, and a storage medium. In the embodiments of this application, a face image transmitted by a target device is received; then a residual fingerprint of the face image is extracted; then the device fingerprint information corresponding to the target device is obtained from a fingerprint information library, the fingerprint information library containing device fingerprint information corresponding to at least one verified device; then a device fingerprint component corresponding to the residual fingerprint information is obtained from the device fingerprint information according to position indication information of the face image, and a degree of correlation between the residual fingerprint information and the device fingerprint component is calculated; and when the degree of (Continued)

correlation is greater than or equal to the preset threshold, it is determined that the face image passes verification.

20 Claims, 9 Drawing Sheets

(51) Int. Cl.
  *G06F 21/44* (2013.01)
  *G06V 10/30* (2022.01)

(56) References Cited

FOREIGN PATENT DOCUMENTS

CN  111241345 A  6/2020
WO  WO-2020093353 A1 *  5/2020

OTHER PUBLICATIONS

Tencent Technology, WO, PCT/CN2022/073999, Apr. 1, 2022, 4 pgs.
Tencent Technology, IPRP, PCT/CN2022/073999, Jul. 31, 2023, 5 pgs.

* cited by examiner

FACE IMAGE VERIFICATION METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2022/073999, entitled "FACE IMAGE VERIFICATION METHOD AND APPARATUS, ELECTRONIC DEVICE AND STORAGE MEDIUM" filed on Jan. 26, 2022, which claims priority to Chinese Patent Application No. 202110138138.8, filed with the State Intellectual Property Office of the People's Republic of China on Feb. 1, 2021, and entitled "FACE IMAGE LEGALITY VERIFICATION METHOD AND APPARATUS, ELECTRONIC DEVICE, AND STORAGE MEDIUM", all of which are incorporated herein by reference in their entirety.

FIELD OF THE TECHNOLOGY

This application relates to the field of computer technologies, and specifically, to a face image verification method and apparatus, an electronic device, and a storage medium.

BACKGROUND OF THE DISCLOSURE

Face recognition is a biometric recognition technology of identification based on feature information of a human face. With the rapid development of computer technologies, the face recognition technology has been continuously improved and face recognition has been more widely applied. However, the face recognition often encounters fake face injection attacks in the application. The fake face injection attack refers to the tampering and injection of an attacker to the face image in the process of acquisition, storage, processing, and transmission of the face image, so as to break through the living body detection of the face recognition system and achieve the purpose of being disguised as another person's identity for biometric authentication.

SUMMARY

Embodiments of this application provide a face image verification method performed by an electronic device, including:
 receiving a face image transmitted by a target device;
 extracting a residual fingerprint of the face image to obtain residual fingerprint information of the face image;
 obtaining device fingerprint information corresponding to the target device from a fingerprint information library, the device fingerprint information being the fingerprint information contained in a sample image acquired by at least one verified device associated with the fingerprint information library;
 obtaining a device fingerprint component corresponding to the residual fingerprint information from the device fingerprint information according to position indication information of the face image, and calculating a degree of correlation between the residual fingerprint information and the device fingerprint component, where the position indication information of the face image indicates a position of the face image within a imaging range; and
 determining that the face image passes verification when the degree of correlation is greater than or equal to a preset threshold.

Correspondingly, the embodiments of this application further provide a face image verification apparatus, including:
 a receiving unit, configured to receive a face image transmitted by a target device;
 an extraction unit, configured to extract a residual fingerprint of the face image to obtain residual fingerprint information of the face image;
 an obtaining unit, configured to obtain device fingerprint information corresponding to the target device from a fingerprint information library, the device fingerprint information being the fingerprint information contained in a sample image acquired by at least one verified device associated with the fingerprint information library;
 a calculating unit, configured to obtain a device fingerprint component corresponding to the residual fingerprint information from the device fingerprint information according to position indication information of the face image, and calculate a degree of correlation between the residual fingerprint information and the device fingerprint component, where the position indication information of the face image indicates a position of the face image within a imaging range; and
 a determining unit, configured to determine that the face image passes verification when the degree of correlation is greater than or equal to a preset threshold.

In some embodiments, the extraction unit may include a denoising sub-unit and an extraction sub-unit, as follows:
 the denoising sub-unit is configured to perform low pass filtering on the face image and denoise the face image to obtain a denoised face image; and
 the extraction sub-unit is configured to subtract pixels of the denoised face image from pixels of the face image one by one to obtain a pixel difference between the face image and the denoised face image; and determine the residual fingerprint information of the face image according to the pixel difference between the face image and the denoised face image.

In some embodiments, the denoising sub-unit may be further configured to perform multi-scale decomposition on the face image using wavelet transformation to obtain multi-scale sub-images; denoise wavelet coefficients of the multi-scale sub-images to obtain denoised sub-images; and reconstruct the denoised sub-images using inverse wavelet transformation to obtain the denoised face image.

In some embodiments, the obtaining unit may be further configured to obtain a device identifier of the target device; determine whether the target device is the verified device according to the device identifier; and search the fingerprint information library for the device fingerprint information corresponding to the device identifier when the target device is the verified device.

In some embodiments, the face image verification apparatus may further include: an establishing unit, where the establishing unit may include an acquisition sub-unit, a determining sub-unit, and a storage sub-unit, as follows:
 the acquisition sub-unit is configured to acquire a plurality of sample images using an image acquisition module of the verified device;
 the determining sub-unit is configured to extract a residual fingerprint of each of the sample images to obtain sample image fingerprint information of the each of the sample images, and determine the device fingerprint information corresponding to the verified device according to the sample image fingerprint information of the each of the sample images; and the storage sub-unit is configured to store the device fingerprint information corresponding to the verified device in the fingerprint information library.

In some embodiments, the acquisition sub-unit is configured to obtain a reference image, the reference image being an image with uniform solid color; set an acquisition parameter of the image acquisition module of the verified device and photograph the reference image for a plurality of times using the image acquisition module based on the acquisition parameter to obtain a plurality of training images; when the image acquisition module outputs through multiple channels, perform channel separation on each of the training images to obtain a plurality of sample images corresponding to the plurality of training images; and when the image acquisition module outputs through a single channel, output the training image as the sample image.

In some embodiments, the determining sub-unit is configured to perform low pass filtering on the each of the sample images, and denoise the each of the sample images to obtain a denoised sample image corresponding to the each of the sample images; subtracting pixels of the denoised sample image corresponding to the each of the sample images from pixels of the each of the sample images one by one to obtain a pixel difference between the each of the sample images and the denoised sample image corresponding to the each of the sample images; determine the sample image fingerprint information of the each of the sample images according to the pixel difference between the each of the sample images and the denoised sample image corresponding to the each of the sample images; and weighted-averaging the sample image fingerprint information of the each of the sample images according to a weight of the each of the sample images, to obtain the device fingerprint information corresponding to the verified device.

In some embodiments, the residual fingerprint information includes a residual fingerprint image, the device fingerprint information includes a device fingerprint image, and the calculating unit may be further configured to determine a region of interest corresponding to the residual fingerprint image of the face image from the device fingerprint image according to the position indication information of the face image; crop the determined region of interest from the device fingerprint image to obtain a device fingerprint sub-image; and calculate a degree of correlation between the residual fingerprint image and the device fingerprint sub-image.

In addition, the embodiments of this application further provide a non-transitory computer-readable storage medium, storing a plurality of instructions, the instructions being suitable for being loaded and executed by a processor of an electronic device, and causing the electronic device to perform the operations of any face image verification method according to the embodiments of this application.

In addition, the embodiments of this application further provide an electronic device, including a memory, a processor, and a computer program stored in the memory and capable of being run on the processor, whereby the electronic device implements the operations of any face image verification method according to the embodiments of this application when executing the program.

According to an aspect of this application, a computer program product or a computer program is provided, the computer program product or the computer program including computer instructions, the computer instructions being stored in a non-transitory computer-readable storage medium, a processor of a computer device reading the computer instructions from the computer-readable storage medium, and the processor executing the computer instructions to cause the computer device to perform methods provided in various implementations of the foregoing face image verification method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person skilled in the art may still derive other accompanying drawings according to the accompanying drawings without creative efforts.

DESCRIPTION OF EMBODIMENTS

Figure 1A:
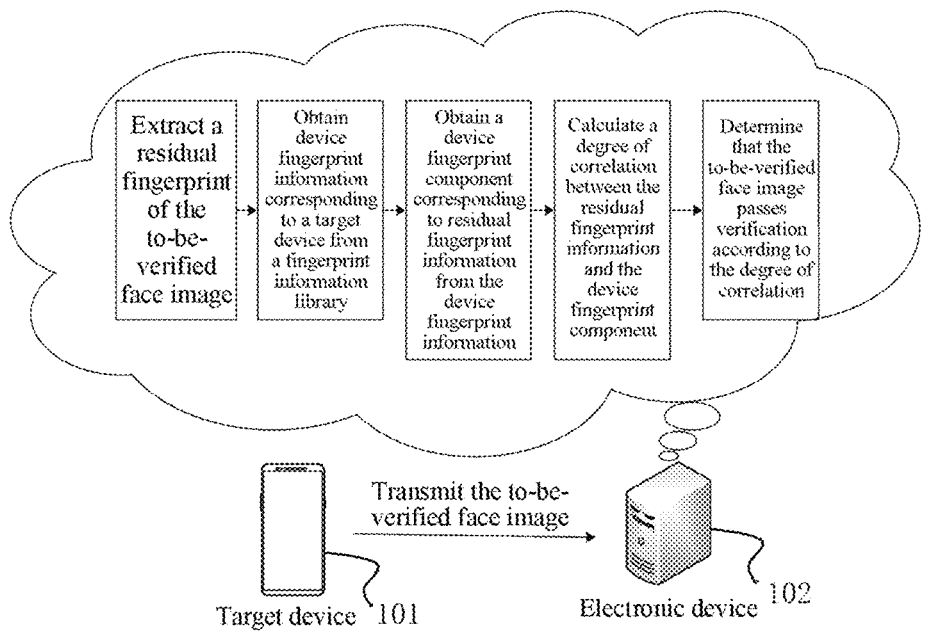
FIG. 1A is a schematic diagram of a scenario of a face image verification method according to an embodiment of this application.

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts fall within the protection scope of this application.

Principles of this application are illustrated for implementing in an applicable operation environment. In the description that follows, specific embodiments of this application will be described with reference to steps and symbolic representations of operations that are performed by one or more computers, unless indicated otherwise. As such, these steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. Data structures in which the data is maintained are physical locations of the memory that have particular properties defined by the format of the data. However, while the principle of this application is being described in the foregoing text, it is not meant to be limiting as a person skilled in the art will appreciate that various steps and operations described below may also be implemented in hardware.

A term "unit" used in the specification may be considered as a software object executed in the computing system. Different components, units, engines, and services described in the specification may be considered as objects implemented in the calculation system. The apparatus and method described in the specification may be implemented in a form of software, and definitely can be implemented in a form of hardware, both of which fall within the protection scope of this application.

In this application, the terms "first", "second", "third", and the like are intended to distinguish between different objects but do not indicate a particular order. In addition, terms "include", "have", and any variations thereof are intended to indicate non-exclusive inclusion. For example, a process, method, system, product, or device that includes a series of steps or units is not limited to the listed steps or units; and instead, some embodiments further include a step or unit that is not listed, or some embodiments further includes another step or unit that is intrinsic to the process, method, product, or device.

Embodiment mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

Related face recognition solutions with a weak security protection ability cannot effectively defend against fake face injection attacks. Therefore, the embodiments of this application provide a face image verification method and apparatus, an electronic device, and a storage medium, to improve face image verification accuracy effectively. The face image verification apparatus may be integrated into an electronic device. The electronic device may be a server, a terminal, or another device.

For example, FIG. 1A is a schematic diagram of a scenario of a face image verification method according to an embodiment of this application. As shown in FIG. 1A, the schematic diagram of the scenario includes a target device 101 and an electronic device 102.

In some embodiments, the target device 101 may be a terminal device including an image acquisition apparatus configured to acquire a face image, where the image acquisition apparatus may be a camera, a video camera, a still camera, a scanner, and another component or part with a photographing function. When the image acquisition apparatus configured to acquire a face image is the camera, the camera may be an RGB (R represents red, G represents green, and B represents blue) camera, an infrared camera, or a depth camera. In some embodiments, the target device 101 may be used as a face image acquisition terminal.

The electronic device 102 may be a server, a terminal, or another device; where the terminal may include a mobile phone, a tablet computer, a notebook computer, a personal computer (PC), or another device. In some embodiments, the electronic device 101 may be used as a face verification cloud.

In some embodiments, the electronic device integrated with the face image verification apparatus can first receive the face image transmitted by the target device; then extract a residual fingerprint of the face image to obtain residual fingerprint information of the face image; then obtain device fingerprint information corresponding to the target device from a fingerprint information library, the fingerprint information library containing device fingerprint information corresponding to at least one verified device, and the device fingerprint information being fingerprint information contained in a sample image acquired by a verified device; then obtain a device fingerprint component corresponding to the residual fingerprint information from the device fingerprint information according to position indication information of the face image, and calculate a degree of correlation between the residual fingerprint information and the device fingerprint component, where the position indication information of the face image indicates a position of the face image within a imaging range; and then determine whether the face image is a legal face image according to the degree of correlation, for example, determine, when the degree of correlation is greater than or equal to a preset threshold, that the face image is the legal face image. The solution can extract the residual fingerprint from the face image and match the residual fingerprint information of the face image with the device fingerprint information corresponding to the target device, thus verifying whether the face image is taken by a legal camera, causing the face recognition system to have the ability to detect fake face injection attacks, solving the problem that the maliciously injected image is difficult to be detected after the electronic device is cloned or invaded, effectively improving the accuracy and security of the face image verification, and then improving the security of face recognition without adding additional hardware. Therefore, the costs are low and the security is high.

Detailed descriptions are respectively provided below. The description sequence of the following embodiments is not intended to limit orders of the embodiments.

In this embodiment, a description is made from a perspective of a face image verification apparatus, where the face image verification apparatus may be specifically integrated into an electronic device.

Figure 1B:
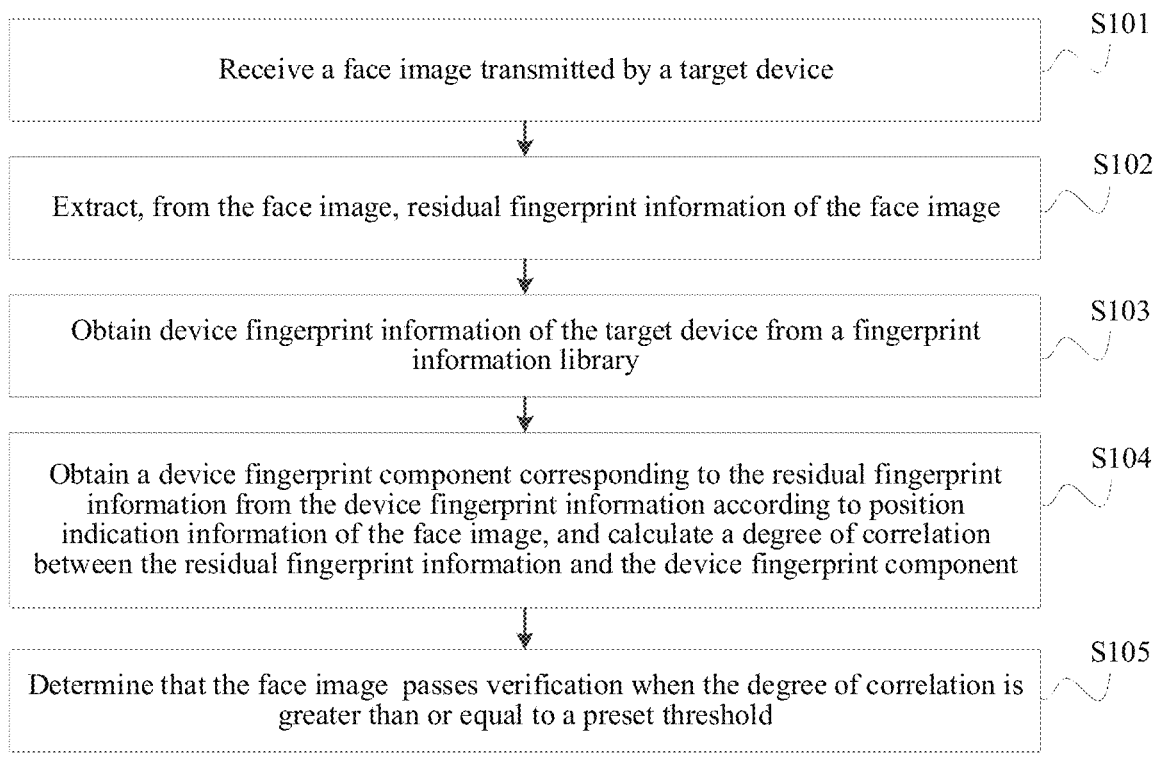
FIG. 1B is a flowchart of a face image verification method according to an embodiment of this application.

As shown in FIG. 1B, a specific procedure of the face image verification method may include the following steps:

S101. Receive a face image transmitted by a target device.

As mentioned above, the face image verification apparatus is integrated into the electronic device. The electronic device may be a terminal device, or a face verification cloud device, for example, the face image verification apparatus integrated into the terminal device can receive the face image transmitted by its own device. The face image verification apparatus integrated into the face verification cloud device can receive the face image transmitted by a face image acquisition terminal. For example, specifically, the target device receives the face image transmitted by the target device, or the face verification cloud device receives the face image transmitted by the target device.

The face image may be an image that needs to undergo image origin verification and can be used for face recognition after passing the verification. In the face recognition, an attacker may tamper with and inject the face image in the process of acquisition, storage, processing, and transmission of the face image, so as to break through the living body detection of the face recognition system and achieve the purpose of being disguised as another person's identity for biometric authentication. Therefore, it is necessary to verify the face image about to undergo the face recognition to determine whether the face image is taken by a legal camera for verification, so that the face recognition system has the ability to detect the fake face injection attacks.

S102. Extract a residual fingerprint of the face image as the residual fingerprint information of the face image.

The residual fingerprint refers to the residual information after filtering out high-level semantics and low-frequency noise information through applying a specific filtering algorithm to a frame of image acquired by the camera. The residual information comes from a unique and unchanging native feature introduced during manufacturing of a photosensitive chip, and can be regarded as special watermark information. For example, a Photo Response Non-Uniformity (PRNU) watermark commonly used for evidence collection is a type of residual fingerprint.

The PRNU is a source of fixed pattern noise of digital cameras. The PRNU refers to a physical phenomenon that the photo response sensitivity of each pixel of the photosensitive element (CMOS/CCD) is not exactly the same under the same lighting condition due to the difference in the thickness of the silicon of the photosensitive element during the manufacturing of sensors. That is, the PRNU is caused by the difference in the thickness of the silicon of the photosensitive element (CMOS/CCD) during the manufacturing of sensors. It can be understood that under the same light condition, the performance of each pixel block of the photosensitive element is not exactly the same. Generally speaking, the PRNU of each different camera is different, like a human fingerprint. Due to the characteristics of the PRNU, the PRNU can be applied in many directions. There are two main application directions: the first is Image Origin Identification. The main application in this field is Image Origin Identification and source camera verification. The main goal of Image Origin Identification is to detect the source camera of a photo among suspicious cameras through a picture or a group of pictures. The goal of source camera verification is to detect whether the picture is taken by a specific camera. The second application direction of the PRNU is Image Forgery Detection, where the PRNU can be considered as a watermark for detecting fake images. Because some images are faked by copying, moving, or the like which changes the characteristic PRNU of the image, the property can be used to detect whether the image is faked.

There are many ways of extracting the residual fingerprint of the face image. In some embodiments, the filtering method of preserving low frequencies and removing high frequencies can be used to filter the face image. After the filtering, pixels of an image before the filtering are subtracted from pixels of a filtered image one by one, and the result of the subtraction is used as the residual fingerprint of the face image. For example, low pass filtering can be performed on the face image to denoise the face image to obtain a denoised face image; the pixel difference between the face image and the denoised face image is obtained through subtracting pixels of the denoised face image from pixels of the face image one by one; and the residual fingerprint information of the face image is determined according to the pixel difference between the face image and the denoised face image.

In some embodiments, there are many ways of performing the low pass filtering on the face image, such as using wavelet transformation filtering, Wiener filtering, mean filtering, and Fourier low pass filtering. For example, specifically, multi-scale decomposition is performed on the face image using wavelet transformation to obtain multi-scale sub-images; wavelet coefficients of the multi-scale sub-images are denoised to obtain denoised sub-images; and the denoised sub-images are reconstructed using inverse wavelet transformation to obtain the denoised face image.

S103. Obtain the device fingerprint information corresponding to the target device from the fingerprint information library.

The fingerprint information library may contain the device fingerprint information of the at least one verified device, and the device fingerprint information is the fingerprint information of the verified device contained in a sample image acquired by the verified device. For example, in order to improve verification efficiency, the verified device can be used to acquire the sample image, and then the fingerprint information of the verified device is extracted from the sample image and stored in the fingerprint information library to conveniently and fast search the fingerprint information library for the fingerprint information corresponding to the device.

In some embodiments, the verified device in the fingerprint information library has a preset identifier used to indicate that the device passes verification and the device fingerprint information of the device can be used to verify an image to be verified. In some embodiments, the verified device may also be referred to as a legal device.

Figure 1C:
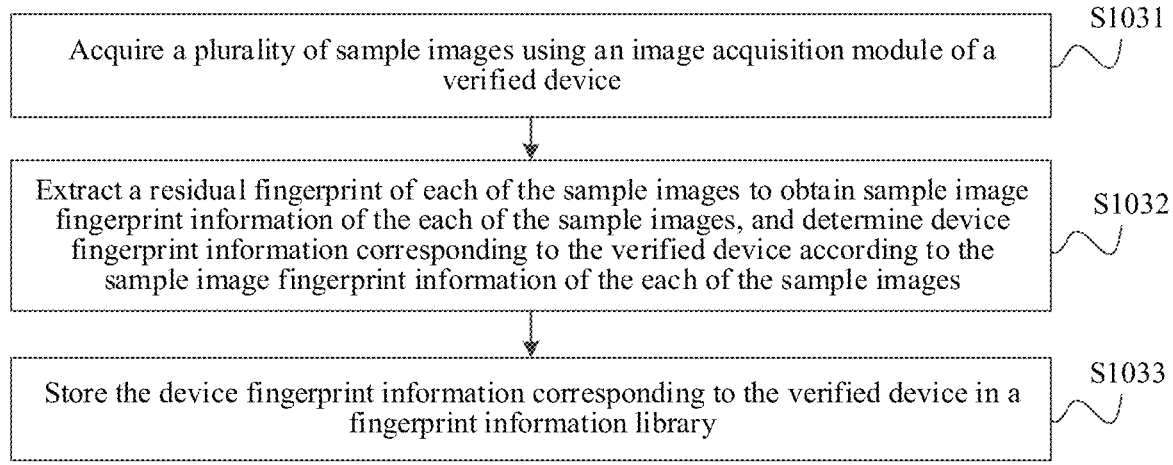
FIG. 1C is a flowchart of storing device fingerprint information corresponding to a verified device according to an embodiment of this application.

FIG. 1C is a flowchart of storing the device fingerprint information corresponding to the verified device according to an embodiment of this application. As shown in FIG. 1C, the procedure includes the following steps:

Step S1031. Acquire a plurality of sample images using the image acquisition module of the verified device.

Step S1032. Extract a residual fingerprint of each of the sample images as the sample image fingerprint information of the each of the sample images, and determine the device fingerprint information corresponding to the verified device according to the sample image fingerprint information of the each of the sample images.

Step S1033. Store the device fingerprint information corresponding to the verified device in the fingerprint information library.

In some embodiments, there are many ways of acquiring a plurality of sample images using the image acquisition module of the verified device, for example, specifically, obtaining a reference image, the reference image being an image with uniform solid color; setting the acquisition parameter of the image acquisition module of the verified device, and photographing the reference image for a plurality of times using the image acquisition module based on the acquisition parameter to obtain a plurality of training images; when the image acquisition module outputs through multiple channels, performing channel separation on the each of the training images, that is, splitting each multi-channel training image into a plurality of single-channel images to obtain a plurality of sample images corresponding to the plurality of training images; and when the image acquisition module outputs through a single channel, outputting the training image as the sample image.

The image acquisition module may refer to a module that can acquire images, such as a camera, a video camera, a still camera, a scanner, and another component or part with a photographing function.

In some embodiments, in order to improve accuracy of the face image verification, residual fingerprints of a plurality of sample images can be extracted and weighted-average to obtain the device fingerprint information corresponding to the verified device. For example, specifically, the low pass filtering can be performed on each of the sample images, and the each of the sample images is denoised to obtain a denoised sample image corresponding to the each of the sample images; pixel difference between the each of the sample images and the denoised sample image corresponding to the each of the sample images is obtained through subtracting pixels of the denoised sample image corresponding to the each of the sample images from pixels of the each of the sample images; sample image fingerprint information of the each of the sample images is determined according to the pixel difference between the each of the sample images and the denoised sample image corresponding to the each of the sample images; and the sample image fingerprint information of the each of the sample images is weighted-average according to a weight of the each of the sample images to obtain the device fingerprint information corresponding to the verified device.

There are also many ways of performing low pass filtering on the sample image, such as using wavelet transformation filtering, Wiener filtering, mean filtering, and Fourier low pass filtering. For example, specifically, the multi-scale decomposition is performed on the sample image using wavelet transformation to obtain multi-scale sample sub-images; the wavelet coefficients of the multi-scale sample sub-images are denoised to obtain denoised sample sub-images; and the denoised sample sub-images are constructed using inverse wavelet transformation to obtain the denoised sample image.

In some embodiments, there may be many ways of storing the device fingerprint information corresponding to the verified device in the fingerprint information library, for example, the device identifier of the verified device and the device fingerprint information corresponding to the verified device may be stored in the fingerprint information library through binding or in the form of one-to-one mapping. Therefore, the fingerprint information corresponding to the device identifier can be searched for from the fingerprint information library according to the device identifier subsequently. For example, specifically, the device identifier of the verified device and the device fingerprint information corresponding to the verified device can be stored in the fingerprint information library.

Then in some embodiments, the device fingerprint information corresponding to the target device can be obtained from the fingerprint information library by the device identifier through searching the fingerprint information library for the fingerprint information corresponding to the device identifier. For example, specifically, the device identifier of the target device can be obtained; whether the target device is the verified device is determined according to the device identifier; and the device fingerprint information corresponding to the device identifier is searched for from the fingerprint information library when the target device is the verified device. The face image is determined as an illegal face image when the target device is not the verified device (that is, the target device is an illegal device).

S104. Obtain a device fingerprint component corresponding to the residual fingerprint information from the device fingerprint information according to position indication information of the face image, and calculate a degree of correlation between the residual fingerprint information and the device fingerprint component.

The position indication information of the face image indicates a position of the face image within a imaging range, and may be position information indicated by a region of interest (ROI) of the face image, including initial coordinates and information of width (W), height (H), and the like of the face image. The face image may include the position indication information, the residual fingerprint information may include the residual fingerprint image, and the device fingerprint information may include the device fingerprint image.

There may be many ways of obtaining the device fingerprint component corresponding to the residual fingerprint information from the device fingerprint information according to the position indication information of the face image, for example, the position of the face image within the imaging range can be determined according to the position indication information of the face image, and then the device fingerprint component corresponding to the position can be obtained in the residual fingerprint information. There may be many methods of calculating the degree of correlation between the residual fingerprint information and the device fingerprint component, for example, the methods may include peak-to-correlation energy (PCE) and Normalized Cross Correlation (NCC).

In some embodiments, the degree of correlation between the face image and the device fingerprint component can be calculated according to the residual fingerprint image of the face image and the device fingerprint image corresponding to the face image. For example, specifically, a region of interest corresponding to the residual fingerprint image of the face image is determined from the device fingerprint image according to the position indication information of the face image; the determined region of interest is cropped from the device fingerprint image to obtain a device fingerprint sub-image; and the degree of correlation between the residual fingerprint image and the device fingerprint sub-image is calculated. For example, the position indication information may include the initial coordinates and the information of length and width. The device fingerprint sub-image is cropped from the device fingerprint image according to the initial coordinates and the information of width (W), height (H) and the like of the face image included in the position indication information.

S105. Determine that the face image passes verification when the degree of correlation is greater than or equal to a preset threshold.

For example, specifically, whether the face image passes verification can be determined according to the degree of correlation. When the face image passes verification, the face image may be also referred to as a legal face image. If the degree of correlation is greater than or equal to the preset threshold, it is determined that the face image passes verification, and if the degree of correlation is less than the preset threshold, it is determined that the face image does not pass verification. When the face image does not pass verification, the face image may be also referred to as an illegal face image.

There may be many ways of setting the preset threshold, such as flexibly setting the preset threshold based on requirements of actual application, or presetting and storing the preset threshold in an electronic device. In addition, the preset threshold may be set in a terminal, or may be stored in a memory and transmitted to the electronic device, or the like. For example, the preset threshold may be 90%. For example, when the degree of correlation is greater than or equal to 90%, the face image is determined as a legal face image and the following face recognition service logic can be performed. When the degree of correlation is less than 90%, the face image is determined as an illegal face image and a related risk control policy can be performed. Risk control can refer to the fact that risk managers take various measures and methods to eliminate or reduce the possibility of risk events or reduce the losses caused by risk events.

As can be seen from the above, in this embodiment, the face image transmitted by the target device is received; then a residual fingerprint of the face image is extracted to obtain the residual fingerprint information of the face image; then the device fingerprint information corresponding to the target device is obtained from a fingerprint information library, the fingerprint information library containing device fingerprint information corresponding to at least one verified device, and the device fingerprint information being fingerprint information contained in a sample image acquired by a verified device; then a device fingerprint component corresponding to the residual fingerprint information is obtained from the device fingerprint information according to position indication information of the face image, and a degree of correlation between the residual fingerprint information and the device fingerprint component is calculated, where the position indication information of the face image indicates a position of the face image within a imaging range; and when the degree of correlation is greater than or equal to the preset threshold, it is determined that the face image is a legal face image. The solution can extract the residual fingerprint from the face image and match the residual fingerprint information of the face image with the device fingerprint information corresponding to the target device, thus verifying whether the face image is taken by a legal camera, causing the face recognition system to have the ability to detect fake face injection attacks, solving the problem that the maliciously injected image is difficult to be detected after the electronic device is cloned or invaded, effectively improving the accuracy and security of the face image verification, and then improving the security of face recognition without adding additional hardware. Therefore, the costs are low and the security is high.

According to the method described in the previous embodiment, the following further provides detailed description by using an example.

In this embodiment, a description is made using an example in which the face image verification apparatus is specifically integrated in the electronic device, the electronic device can specifically be a face verification cloud, the target device can specifically be a face image acquisition terminal, and the image acquisition module can specifically be a camera of the face image acquisition terminal.

The face image acquisition terminal may refer to a device in charge of the face image acquisition, preprocessing, living body detection, and finally uploading the face image to the cloud for verification in the face recognition system, such as a face swiping payment machine, a self-service face swiping vending machine, and a mobile phone. The face verification cloud refers to a cloud server in charge of receiving the face image uploaded by the terminal, performing living body detection on the image, and finally completing the face recognition verification in the face recognition system. Online face recognition may refer to a face recognition solution where the face image acquisition terminal acquires the face image and uploads the face image to the face verification cloud for recognition and verification. The fake face injection attack may refer to the tampering and injection of an attacker to the face image in the process of acquisition, storage, processing, and transmission of the face image, so as to break through the living body detection of the face recognition system and achieve the purpose of being disguised as another person's identity for biometric authentication.

Figure 2A:
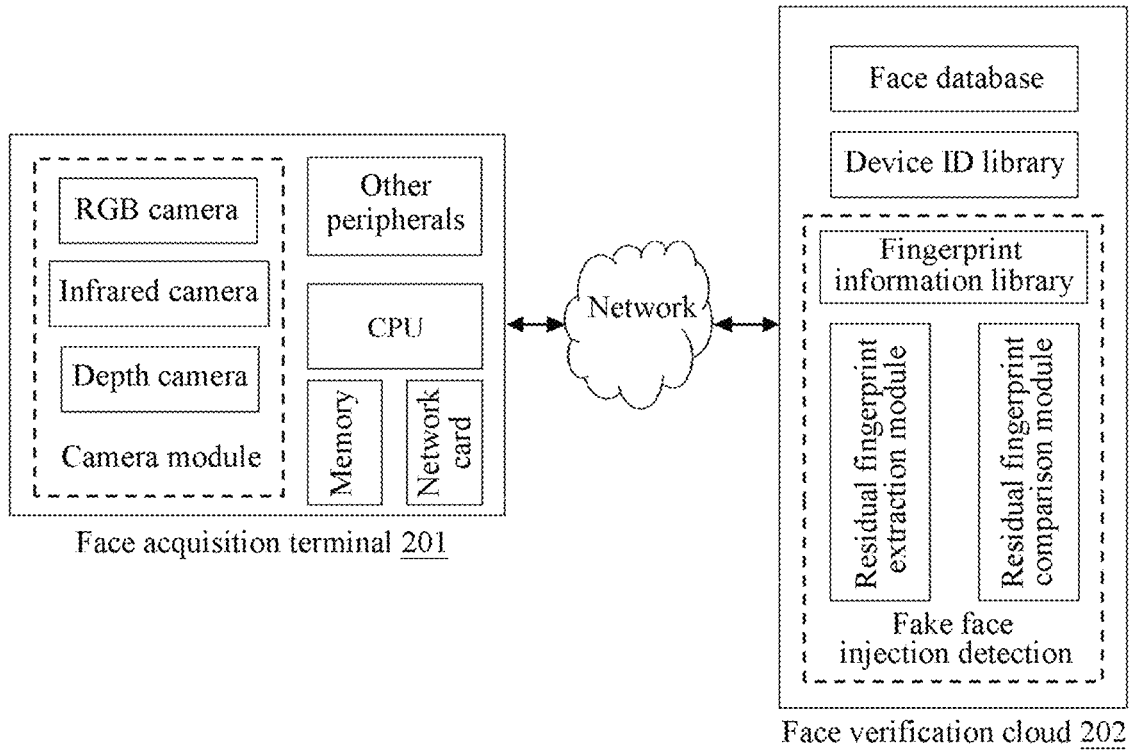
FIG. 2A is an architectural diagram of a face image verification system according to an embodiment of this application.

(1) First, the verified device can be used to acquire the sample image, and then the fingerprint information of the verified device is extracted from the sample image and stored in the fingerprint information library, which can be specifically as follows:

The infrastructure of the involved face image verification system may be as shown in FIG. 2A. The entire system consists of two parts: a face image acquisition terminal 201 and a face verification cloud 202. The typical characteristic of the system is that the face image acquisition terminal acquires the face image through a camera and transmits the face image and other related information to the face verification cloud through a network for identity verification and anti-counterfeit identification.

For example, the face image acquisition terminal 201 may be either a face swiping payment machine disposed in a large supermarket or a portable device such as a mobile phone. The camera for acquiring the face image on the face image acquisition terminal may be an RGB (R represents red, G represents green, and B represents blue) camera, an infrared camera, or a depth camera. The camera may output through multiple channels or a single channel. In some embodiments, in order to improve verification efficiency, the face image for verification acquired by the camera cannot undergo rotation transformation, facial beautification, and lossy compression with a high compression ratio.

The RGB camera may refer to a color camera that receives visible light irradiation and outputs a three-channel image of red, green, and blue. The infrared camera may refer to a camera that receives infrared irradiation and outputs a single-channel image. The depth camera may refer to a camera that obtains 3D information of a measured object using principles of structured light, TOF, and the like.

For example, the face verification cloud 202 includes at least components such as a face database, a device identifier (ID) library, a device residual fingerprint information library (briefly referred to as fingerprint information library), a residual fingerprint extraction module, and a residual fingerprint comparison module. Such three components as the device residual fingerprint information library, the residual fingerprint extraction module, and the residual fingerprint comparison module are related to the fake face injection detection function.

Figure 2B:
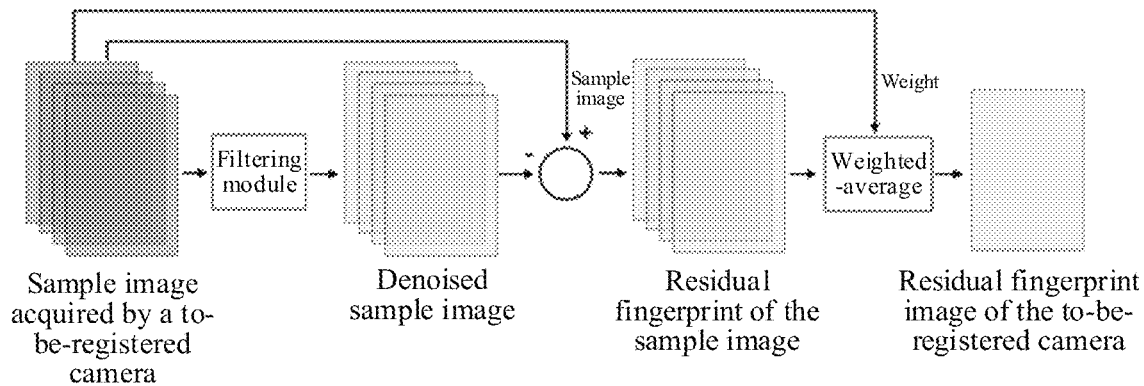
FIG. 2B is a flowchart of extracting a residual fingerprint of a to-be-registered camera according to an embodiment of this application.

For example, as shown in FIG. 2B, a group of sample images for training can be acquired using the to-be-registered camera (the image acquisition module of the verified device), and filtered by a filtering module to obtain filtered and denoised sample images. Then a group of residual fingerprint images is obtained after subtracting the pixels of the images after filtering from the pixels of the images before filtering one by one. Finally, the group of residual fingerprint images can be weighted-average with the pixel values or the squares of the pixel values of the original images as the weight to obtain a final residual fingerprint image of the to-be-registered camera. For example, specifically, the electronic device can acquire a plurality of sample images using the image acquisition module of the verified device; extract a residual fingerprint of each of the sample images to obtain sample image fingerprint information of the each of the sample images, and determine the device fingerprint information corresponding to the verified device according to the sample image fingerprint information of the each of the sample images; and store the device fingerprint information corresponding to the verified device in the fingerprint information library.

Figure 2C:
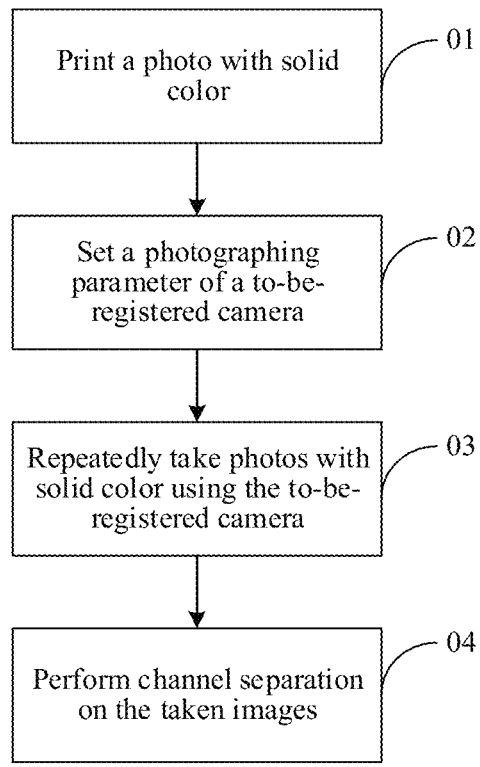
FIG. 2C is a flowchart of acquiring a sample image according to an embodiment of this application.

Steps of acquiring the training images using the to-be-registered camera may be shown in FIG. 2C. First, print a photo with uniform solid color (the reference image); then adjust the focal length of the camera to infinity and set the exposure mode to auto exposure; then place the printed uniform solid color photo at 10 to 30 cm in front of the camera to ensure that the picture fills the whole frame of the camera; then take 20 to 50 photos continuously under a standard indoor workplace lighting condition; finally, when the camera outputs through multiple channels, split one multi-channel photo into a plurality of single-channel photos, or when the camera outputs through a single channel, output the taken photos directly.

In some embodiments, specifically, the electronic device can obtain the reference image, the reference image being an image with uniform solid color; set the acquisition parameter of the image acquisition module of the verified device and photograph the reference image for a plurality of times using the image acquisition module based on the acquisition parameter to obtain a plurality of training images; when the image acquisition module outputs through multiple channels, perform channel separation on each of the training images to obtain a plurality of sample images; and when the image acquisition module outputs through a single channel, output the training image as the sample image.

In order to improve accuracy of the face image verification, residual fingerprints of a plurality of sample images can be extracted and weighted-average to obtain the device fingerprint information corresponding to the verified device. For example, specifically, the electronic device can perform the low pass filtering on each of the sample images, denoise the each of the sample images to obtain a denoised sample image corresponding to the each of the sample images; subtract pixels of the denoised sample image corresponding to the each of the sample images from pixels of the each of the sample images one by one to obtain the pixel difference between the each of the sample images and the denoised sample image corresponding to the each of the sample images; determine the sample image fingerprint information of the each of the sample images according to the pixel difference between the each of the sample images and the denoised sample image corresponding to the each of the sample images; and weighted-average the sample image fingerprint information of the each of the sample images according to a weight of the each of the sample images to obtain the device fingerprint information corresponding to the verified device.

The filtering module in FIG. 2B may use the filtering methods preserving low frequencies and removing high frequencies including but not limited to the wavelet transformation filtering, the Wiener filtering, the mean filtering, and the Fourier low pass filtering. Then the pixels of all the images after filtering are subtracted from the pixels of the corresponding images before filtering one by one to obtain a group of residual fingerprints; and then all the residual fingerprints are weighted-average according to the positions of the pixels with the pixel values or the squares of the pixel values of the corresponding original images as the weights. The result obtained after weighted averaging is used as a residual fingerprint full image for the registered camera (that is, the device fingerprint image corresponding to the verified device).

For example, the residual fingerprint full image can be bound to the ID of the device to which the corresponding to-be-registered camera belongs, and IDs and residual fingerprints of all the verified devices are stored in the face verification cloud in the form of the device ID library and the device residual fingerprint information library, so that the fingerprint information corresponding to the device identifier can be searched for from the device residual fingerprint information library according to the device identifier. For example, specifically, the electronic device can store the device identifier of the verified device and the device fingerprint information corresponding to the verified device in the fingerprint information library.

Through the above steps, the fingerprint information of the verified device is collected, and then the device fingerprint information collected in the fingerprint information library can be used to verify the face image.

(2) Then, the face image can be verified using the device fingerprint information collected in the fingerprint information library. For details, reference may be made to FIG. 2D.

Figure 2D:
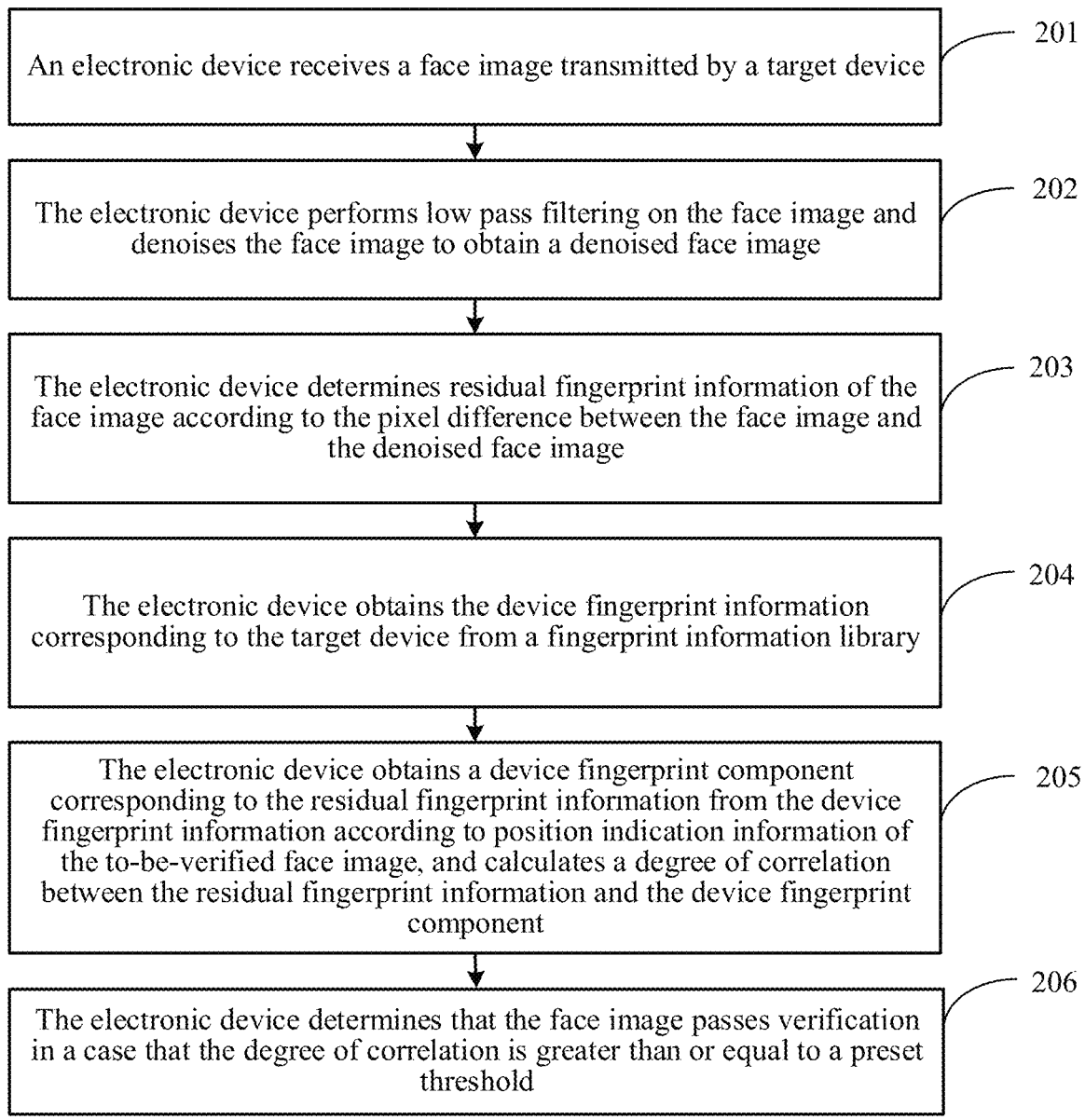
FIG. 2D is a flowchart of a face image verification method according to an embodiment of this application.

As shown in FIG. 2D, a face image verification method is performed by an electronic device, and a specific procedure may include the following steps:

201. The electronic device receives a face image transmitted by a target device.

For example, specifically, a face verification cloud receives a face image transmitted by a face image acquisition terminal. The face image may be an image that needs to undergo image origin verification and can be used for face recognition after passing the verification. In the face recognition, the attacker may tamper with and inject the face image in the process of acquisition, storage, processing, and transmission of the face image, so as to break through the living body detection of the face recognition system and achieve the purpose of being disguised as another person's identity for biometric authentication. Therefore, it is necessary to verify the face image about to undergo the face recognition to determine whether the face image is taken by the legal camera, so that the face recognition system has the ability to detect the fake face injection attacks.

202. The electronic device performs low pass filtering on the face image and denoises the face image to obtain a denoised face image.

Figure 2E:
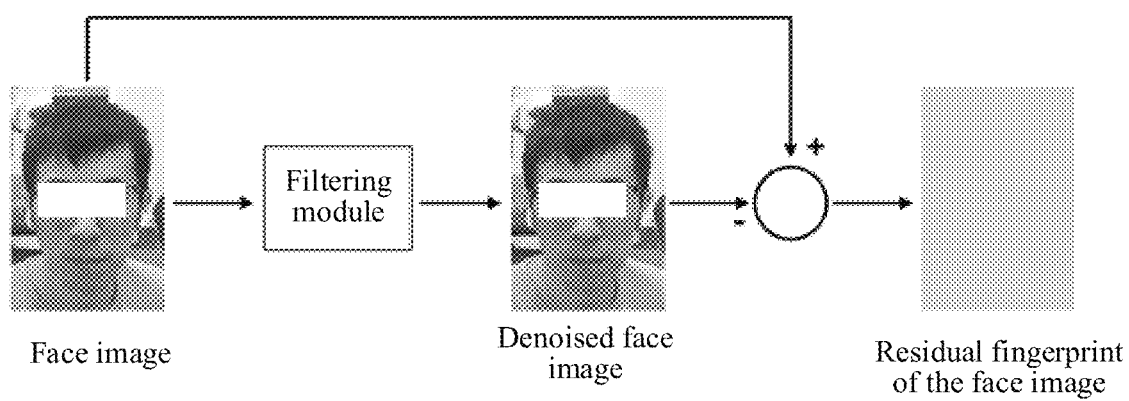
FIG. 2E is a schematic diagram of extracting a residual fingerprint of a face image according to an embodiment of this application.

For example, after receiving the face image uploaded by the face image acquisition terminal, the face verification cloud extracts the residual fingerprint of the face image, and the extraction process is shown in FIG. 2E. The face image first needs to be low-pass filtered through a filtering module exactly the same as the filtering module in FIG. 2B and denoised, to obtain a filtered and denoised face image. For example, specifically, the electronic device can perform the low pass filtering on the face image and denoise the face image to obtain the denoised face image; subtract pixels of the denoised face image from pixels of the face image one by one to obtain the pixel difference between the face image and the denoised face image; and determine the residual fingerprint information of the face image according to the pixel difference between the face image and the denoised face image.

For example, specifically, the electronic device can perform the multi-scale decomposition on the face image using wavelet transformation to obtain multi-scale sub-images; denoise wavelet coefficients of the multi-scale sub-images to obtain the denoised sub-images; and reconstruct the denoised sub-images using inverse wavelet transformation to obtain the denoised face image.

203. The electronic device determines the residual fingerprint information of the face image according to the pixel difference between the face image and the denoised face image.

For example, the electronic device can subtract pixels of the denoised face image from pixels of the face image one by one to obtain the pixel difference between the face image and the denoised face image; and determine the residual fingerprint information of the face image according to the pixel difference between the face image and the denoised face image. Specifically, the electronic device can subtract pixels of the denoised face image from pixels of the face image one by one to obtain the pixel difference between the face image and the denoised face image, and then the result of subtraction (that is, the pixel difference) is used as the residual fingerprint image of the face image.

204. The electronic device obtains the device fingerprint information corresponding to the target device from the fingerprint information library.

The fingerprint information library may contain the device fingerprint information of the at least one verified device, and the device fingerprint information is the fingerprint information of the verified device contained in a sample image acquired by the verified device. For example, the fingerprint information corresponding to the device identifier can be searched for in the fingerprint information library by the device identifier. For example, specifically, the electronic device can obtain the device identifier of the target device; determine whether the target device is the verified device according to the device identifier; and search the fingerprint information library for the device fingerprint information corresponding to the device identifier when the target device is the verified device.

205. The electronic device obtains a device fingerprint component corresponding to the residual fingerprint information from the device fingerprint information according to position indication information of the face image, and calculates a degree of correlation between the residual fingerprint information and the device fingerprint component.

The position indication information of the face image indicates a position of the face image within a imaging range, and may be position information indicated by a region of interest (ROI) of the face image, including initial coordinates and information of width (W), height (H), and the like of the face image. The residual fingerprint information may include the residual fingerprint image, and the device fingerprint information may include the device fingerprint image. The region of interest (ROI) may refer to a region that needs to be processed and that is outlined in a rectangle, a circle, an ellipse, an irregular polygon, or the like from a processed image in machine vision and image processing.

Figure 2F:
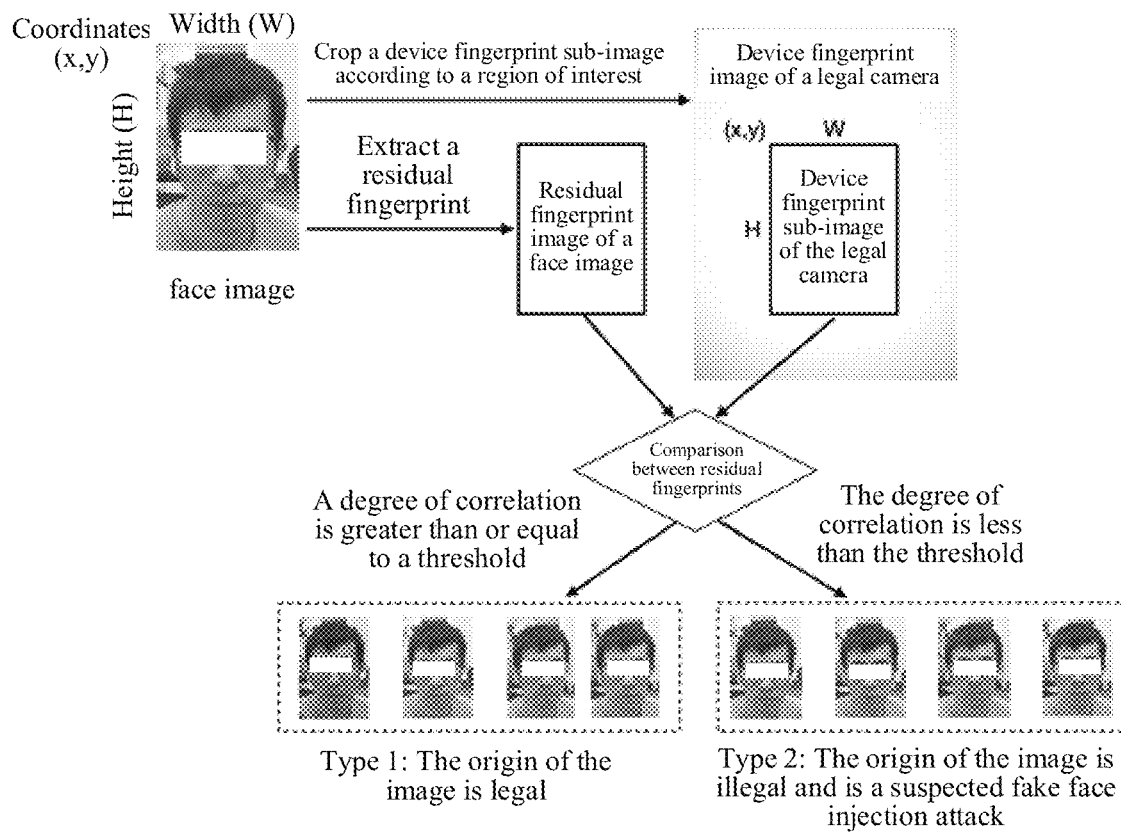
FIG. 2F is a flowchart of a face image verification method according to an embodiment of this application.

For example, as shown in FIG. 2F, after receiving the position indication information of the face image uploaded by the face image acquisition terminal, the face verification cloud crops a residual fingerprint sub-image from the residual fingerprint full image according to initial coordinates (x, y) and information of width (W) and height (H) of the face image contained in position indication information.

For example, specifically, the electronic device can determine the region of interest corresponding to the residual fingerprint image of the face image from the device fingerprint image according to the position indication information of the face image; crop the determined region of interest from the device fingerprint image to obtain a device fingerprint sub-image; and calculate the degree of correlation between the residual fingerprint image and the device fingerprint sub-image. The residual fingerprints of the face image and the face image acquisition terminal are compared through calculating the degree of correlation between the residual fingerprint image and the device fingerprint sub-image. The method of calculating the degree of correlation between the residual fingerprint image and the device fingerprint sub-image may include peak-to-correlation energy, Normalized Cross Correlation, and the like.

206. The electronic device determines that the face image passes verification when the degree of correlation is greater than or equal to a preset threshold.

For example, specifically, the electronic device can determine whether the face image passes verification according to the degree of correlation. When the degree of correlation is greater than or equal to the preset threshold, the electronic device determines that the face image passes verification, and the face image is referred to as a legal face image (that is, the origin of the face image is legal). When the degree of correlation is less than the preset threshold, the electronic device determines that the face image does not pass verification, and the face image is referred to as an illegal face image (that is, the origin of the face image is illegal, and is a suspected fake face injection attack).

There may be many ways of setting the preset threshold, such as flexibly setting the preset threshold based on requirements of actual application, or presetting and storing the preset threshold in an electronic device. In addition, the preset threshold may be set in a terminal, or may be stored in a memory and transmitted to the electronic device, or the like. For example, the preset threshold may be 90%. For example, when the degree of correlation is greater than or equal to 90%, the face image is determined as a legal face image and the following face recognition service logic can be performed. When the degree of correlation is less than 90%, the face image is determined as an illegal face image and a related risk control policy can be performed.

Figure 2G:
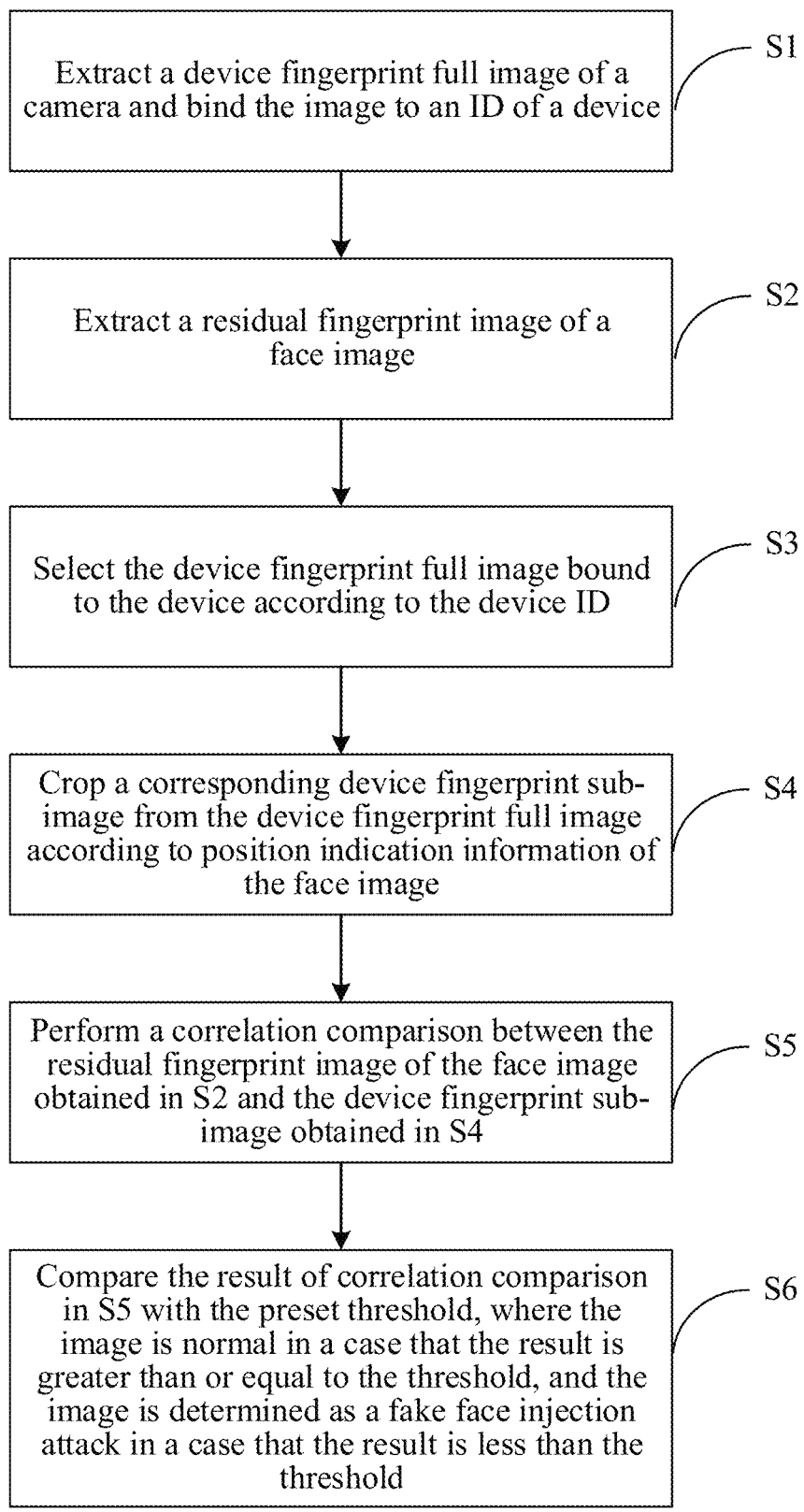
FIG. 2G is a flowchart of a face image verification method according to an embodiment of this application.

In summary, as shown in FIG. 2G, the face image verification may include the following brief steps:

S1. Extract the device fingerprint full image of the camera (which may include, for example, the residual fingerprint of the camera within the imaging range), and bind the residual fingerprint full image to the ID of the device where the camera is located.

S2. Obtain the face image and the position indication information of the face image, and extract the residual fingerprint image of the face image from the face image.

S3. Select the device fingerprint full image bound to the device according to the device ID.

S4. Crop the device fingerprint sub-image corresponding to the residual fingerprint image of the face image from the device fingerprint full image according to the position indication information of the face image.

S5. Perform a correlation comparison between the residual fingerprint image of the face image obtained in S2 and the device fingerprint sub-image obtained in S4.

S6. Compare the result of correlation comparison in S5 with the preset threshold, where if the result is greater than or equal to the preset threshold, the image is determined as a normal face image and a next operation of the face recognition can be performed; otherwise, the image is determined as the fake face injection attack and the face recognition is stopped from being performed on the face image.

As can be seen from the above, in this embodiment, the face image transmitted by the target device is received; then a residual fingerprint of the face image is extracted to obtain the residual fingerprint information of the face image; then the device fingerprint information corresponding to the target device is obtained from a fingerprint information library, the fingerprint information library containing device fingerprint information corresponding to at least one verified device, and the device fingerprint information being fingerprint information contained in a sample image acquired by a verified device; then a device fingerprint component corresponding to the residual fingerprint information is obtained from the device fingerprint information according to position indication information of the face image, and a degree of correlation between the residual fingerprint information and the device fingerprint component is calculated, where the position indication information of the face image indicates a position of the face image within a imaging range; and when the degree of correlation is greater than or equal to the preset threshold, it is determined that the face image passes verification. The solution may provide a risk control method of online face recognition defending against the fake face injection attack. The method can verify whether an inputted face image is taken by the legal camera through extracting the residual fingerprint of the camera and registering and matching the residual fingerprint of the inputted face image with the residual fingerprint of the legal camera, so that the face recognition system has the ability to detect fake face injection attacks. Because the solution solves the problem that the images injected maliciously after the terminal is cloned or invaded are difficult to be detected, has high security and does not require additional hardware or hardware modification and upgrading, the solution has the advantages of low deployment costs and a low false alarm rate. In addition, the solution can be carried out in the cloud, and the unique proof of verification is whether the face image includes the residual fingerprint of the legal camera. Therefore, even if the face image acquisition terminal is attacked and rendered untrustworthy, as long as there is not the residual fingerprint of the corresponding device in the image injected, the image injected is intercepted by the solution. In addition, the residual fingerprint of the camera comes from a native feature of a photosensitive chip and does not need to be added locally through calculation. Therefore, the attacker cannot know the existence of a risk control mechanism via reverse terminal software. In addition, even if the attacker knows the existence of the type of risk control mechanism, to generate a residual fingerprint for a certain camera, a large number of original photos of the camera need to be obtained, and a very high technical threshold is further required, thus preventing the attacker from performing fraudulent swiping to avoid the loss of the property of the victim.

To better implement the foregoing method, correspondingly, the embodiments of this application further provide a face image verification apparatus. The face image verification apparatus may be specifically integrated into an electronic device. The electronic device may be a server, a terminal, or another device.

Figure 3:
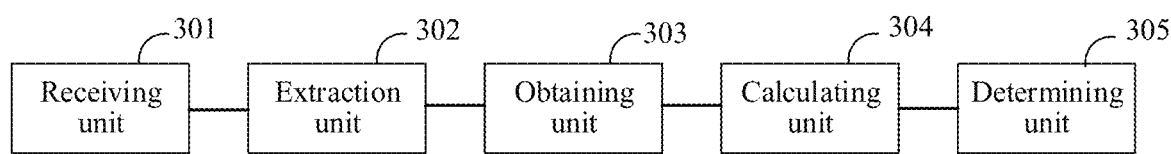
FIG. 3 is a schematic structural diagram of a face image verification apparatus according to an embodiment of this application.

For example, as shown in FIG. 3, the face image verification apparatus may include a receiving unit 301, an extraction unit 302, an obtaining unit 303, a calculating unit 304, and a determining unit 305 as follows:

The receiving unit 301 is configured to receive a face image transmitted by a target device;

the extraction unit 302 is configured to extract a residual fingerprint of the face image to obtain residual fingerprint information of the face image;

the obtaining unit 303 is configured to obtain device fingerprint information corresponding to the target device from a fingerprint information library, the fingerprint information library containing device fingerprint information corresponding to at least one verified device, and the device fingerprint information being the fingerprint information of the verified device contained in a sample image acquired by the verified device;

the calculating unit 304 is configured to obtain a device fingerprint component corresponding to the residual fingerprint information from the device fingerprint information according to position indication information of the face image, and calculate a degree of correlation between the residual fingerprint information and the device fingerprint component, where the position indication information of the face image indicates a position of the face image within a imaging range; and the determining unit 305 is configured to determine that the face image passes verification when the degree of correlation is greater than or equal to a preset threshold.

In some embodiments, the extraction unit 302 may include a denoising sub-unit and an extraction sub-unit, as follows:

the denoising sub-unit is configured to perform low pass filtering on the face image and denoise the face image to obtain a denoised face image; and the extraction sub-unit is configured to subtract pixels of the denoised face image from pixels of the face image one by one to obtain a pixel difference between the face image and the denoised face image; and determine the residual fingerprint information of the face image according to the pixel difference between the face image and the denoised face image.

In some embodiments, the denoising sub-unit may be further configured to perform multi-scale decomposition on the face image using wavelet transformation to obtain multi-scale sub-images; denoise wavelet coefficients of the multi-scale sub-images to obtain denoised sub-images; and reconstruct the denoised sub-images using inverse wavelet transformation to obtain the denoised face image.

In some embodiments, the obtaining unit 303 may be further configured to obtain a device identifier of the target device; determine whether the target device is the verified device according to the device identifier; and search the fingerprint information library for the device fingerprint information corresponding to the device identifier when the target device is the verified device.

In some embodiments, the face image verification apparatus may further include: an establishing unit, where the establishing unit may include an acquisition sub-unit, a determining sub-unit, and a storage sub-unit, as follows:

the acquisition sub-unit is configured to acquire a plurality of sample images using an image acquisition module of the verified device;

the determining sub-unit is configured to extract a residual fingerprint of each of the sample images to obtain sample image fingerprint information of the each of the sample images, and determine the device fingerprint information corresponding to the verified device according to the sample image fingerprint information of the each of the sample images; and the storage sub-unit is configured to store the device fingerprint information corresponding to the verified device in the fingerprint information library.

In some embodiments, the acquisition sub-unit is configured to obtain a reference image, the reference image being an image with uniform solid color; set an acquisition parameter of the image acquisition module of the verified device and photograph the reference image for a plurality of times using the image acquisition module based on the acquisition parameter to obtain a plurality of training images; when the image acquisition module outputs through multiple channels, perform channel separation on each of the training images to obtain a plurality of sample images corresponding to the plurality of training images; and when the image acquisition module outputs through a single channel, output the training image as the sample image.

In some embodiments, the determining sub-unit is configured to perform the low pass filtering on each of the sample images, denoise the each of the sample images to obtain a denoised sample image corresponding to the each of the sample images; subtract pixels of the denoised sample image corresponding to the each of the sample images from pixels of the each of the sample images one by one to obtain the pixel difference between the each of the sample images and the denoised sample image corresponding to the each of the sample images; determine the sample image fingerprint information of the each of the sample images according to the pixel difference between the each of the sample images and the denoised sample image corresponding to the each of the sample images; and weighted-average the sample image fingerprint information of the each of the sample images according to a weight of the each of the sample images to obtain the device fingerprint information corresponding to the verified device.

In some embodiments, the residual fingerprint information includes a residual fingerprint image, the device fingerprint information includes a device fingerprint image, and the calculating unit 304 may be further configured to determine a region of interest corresponding to the residual fingerprint image of the face image from the device fingerprint image according to the position indication information of the face image; crop the determined region of interest from the device fingerprint image to obtain a device fingerprint sub-image; and calculate a degree of correlation between the residual fingerprint image and the device fingerprint sub-image.

During specific implementation, the foregoing units may be implemented as independent entities, or may be combined arbitrarily and implemented as the same entity or a plurality of entities. For specific implementation of the foregoing units, reference can be made to the foregoing method embodiments, so the details are not described herein again.

As can be seen from the above, in this embodiment, the receiving unit 301 receives the face image transmitted by the target device; then the extraction unit 302 extracts a residual fingerprint of the face image to obtain the residual fingerprint information of the face image; then the obtaining unit 303 obtains the device fingerprint information corresponding to the target device from a fingerprint information library, the fingerprint information library containing device fingerprint information corresponding to at least one verified device, and the device fingerprint information being fingerprint information contained in a sample image acquired by a verified device; then the calculating unit 304 obtains a device fingerprint component corresponding to the residual fingerprint information from the device fingerprint information according to position indication information of the face image, and calculates a degree of correlation between the residual fingerprint information and the device fingerprint component, where the position indication information of the face image indicates a position of the face image within a imaging range; and when the degree of correlation is greater than or equal to the preset threshold, the determining unit 305 determines that the face image passes verification. The solution can extract the residual fingerprint from the face image and match the residual fingerprint information of the face image with the device fingerprint information corresponding to the target device, thus verifying whether the face image is taken by a legal camera, causing the face recognition system to have the ability to detect fake face injection attacks, solving the problem that the maliciously injected image is difficult to be detected after the electronic device is cloned or invaded, effectively improving the accuracy and security of the face image verification, and then improving the security of face recognition without adding additional hardware. Therefore, the costs are low and the security is high.

Figure 4:
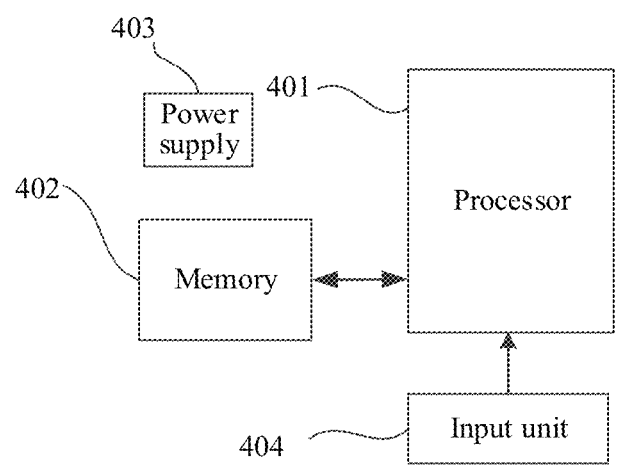
FIG. 4 is a schematic structural diagram of an electronic device according to an embodiment of this application.

In addition, the embodiments of this application further provide an electronic device. FIG. 4 is a schematic structural diagram of an electronic device according to an embodiment of this application. Specifically, the electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limit to the electronic device. The server may include more or fewer parts than those shown in the figure, may combine some parts, or may have different part arrangements.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. In some embodiments, the processor 401 may include the one or more processing cores. In some embodiments, the processor 401 may integrate an application processor and a modem processor. The application processor mainly processes an operating system, a UI, an application program, and the like. The modem processor mainly processes wireless communication. It may be understood that the modem processor may either not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data created according to use of the electronic device, and the like. In addition, the memory 402 may include a high speed RAM, and may further include a non-volatile memory, such as at least one magnetic disk storage device, a flash memory, or another volatile solid storage device. Correspondingly, the memory 402 may further include a memory controller, so that the processor 401 can access the memory 402.

The electronic device further includes the power supply 403 for supplying power to the components. In some embodiments, the power supply 403 may be logically connected to the processor 401 by using a power supply management system, thereby implementing functions, such as charging, discharging, and power consumption management, by using the power supply management system. The power supply 403 may further include one or more direct current or alternating current power supplies, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 of the electronic device may load, according to the following instructions, executable files corresponding to processes of one or more application programs into the memory 402. The processor 401 runs the application programs stored in the memory 402, to implement the various functions as follows:

receiving the face image transmitted by the target device; then extracting a residual fingerprint of the face image to obtain the residual fingerprint information of the face image; then obtaining the device fingerprint information corresponding to the target device from a fingerprint information library, the fingerprint information library containing device fingerprint information corresponding to at least one verified device, and the device fingerprint information being fingerprint information contained in a sample image acquired by a verified device; then obtaining a device fingerprint component corresponding to the residual fingerprint information from the device fingerprint information according to position indication information of the face image, and calculating a degree of correlation between the residual fingerprint information and the device fingerprint component, where the position indication information of the face image indicates a position of the face image within a imaging range; and when the degree of correlation is greater than or equal to the preset threshold, determining that the face image passes verification.

For specific implementation of the foregoing operations, reference may be made to the foregoing embodiments. Details are not described herein again.

As can be seen from the above, in this embodiment, the face image transmitted by the target device is received; then a residual fingerprint of the face image is extracted to obtain the residual fingerprint information of the face image; then the device fingerprint information corresponding to the target device is obtained from a fingerprint information library, the fingerprint information library containing device fingerprint information corresponding to at least one verified device, and the device fingerprint information being fingerprint information contained in a sample image acquired by a verified device; then a device fingerprint component corresponding to the residual fingerprint information is obtained from the device fingerprint information according to position indication information of the face image, and a degree of correlation between the residual fingerprint information and the device fingerprint component is calculated, where the position indication information of the face image indicates a position of the face image within a imaging range; and when the degree of correlation is greater than or equal to the preset threshold, it is determined that the face image passes verification. The solution can extract the residual fingerprint from the face image and match the residual fingerprint information of the face image with the device fingerprint information corresponding to the target device, thus verifying whether the face image is taken by a legal camera, causing the face recognition system to have the ability to detect fake face injection attacks, solving the problem that the maliciously injected image is difficult to be detected after the electronic device is cloned or invaded, effectively improving the accuracy and security of the face image verification, and then improving the security of face recognition without adding additional hardware. Therefore, the costs are low and the security is high.

A person of ordinary skill in the art can understand that, all or some steps of various methods in the embodiments may be implemented through instructions, or implemented through instructions controlling relevant hardware, and the instructions may be stored in a computer-readable storage medium and loaded and executed by a processor.

Accordingly, the embodiments of this application further provide a storage medium, storing a plurality of instructions. The instructions can be loaded by a processor, to perform the steps in any face image verification method according to the embodiments of this application. For example, the instructions may perform the following steps:

receiving the face image transmitted by the target device; then extracting a residual fingerprint of the face image to obtain the residual fingerprint information of the face image; then obtaining the device fingerprint information corresponding to the target device from a fingerprint information library, the fingerprint information library containing device fingerprint information corresponding to at least one verified device, and the device fingerprint information being fingerprint information contained in a sample image acquired by a verified device; then obtaining a device fingerprint component corresponding to the residual fingerprint information from the device fingerprint information according to position indication information of the face image, and calculating a degree of correlation between the residual fingerprint information and the device fingerprint component, where the position indication information of the face image indicates a position of the face image within a imaging range; and when the degree of correlation is greater than or equal to the preset threshold, determining that the face image passes verification.

For specific implementation of the foregoing operations, reference may be made to the foregoing embodiments. Details are not described herein again.

The storage medium may include: a read-only memory (ROM), a random access memory (RAM), a magnetic disk, an optical disc or the like.

Because the instructions stored in the storage medium may perform the steps of any face image verification method provided in the embodiments of this application, the instructions can implement beneficial effects that may be implemented by any face image verification method in the embodiments of this application. For details, refer to the foregoing embodiments. Details are not described herein again.

The face image verification method and apparatus, the electronic device, and the storage medium provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A face image verification method performed by an electronic device, the method comprising:
    receiving a face image transmitted by a target device;
    extracting, from the face image, residual fingerprint information of the face image;
    obtaining device fingerprint information corresponding to the target device from a fingerprint information library, the device fingerprint information being the fingerprint information contained in a sample image acquired by at least one verified device associated with the fingerprint information library;
    obtaining a device fingerprint component corresponding to the residual fingerprint information from the device fingerprint information according to position indication information of the face image, and calculating a degree of correlation between the residual fingerprint information and the device fingerprint component, the position indication information of the face image being used for indicating a position of the face image within a imaging range; and
    determining that the face image passes verification when the degree of correlation is greater than or equal to a preset threshold.

2. The method according to claim 1, wherein the extracting, from the face image, residual fingerprint information of the face image comprises:
    performing low pass filtering on the face image and denoising the face image to obtain a denoised face image;
    subtracting pixels of the denoised face image from pixels of the face image one by one to obtain a pixel difference between the face image and the denoised face image; and
    determining the residual fingerprint information of the face image according to the pixel difference between the face image and the denoised face image.

3. The method according to claim 2, wherein the performing low pass filtering on the face image and denoising the face image to obtain a denoised face image comprises:
    performing multi-scale decomposition on the face image using wavelet transformation to obtain multi-scale sub-images;
    denoising wavelet coefficients of the multi-scale sub-images to obtain denoised sub-images; and
    reconstructing the denoised sub-images using inverse wavelet transformation to obtain the denoised face image.

4. The method according to claim 1, wherein the obtaining device fingerprint information corresponding to the target device from a fingerprint information library comprises:
    obtaining a device identifier of the target device;
    determining whether the target device is the verified device according to the device identifier; and
    searching the fingerprint information library for the device fingerprint information corresponding to the device identifier when the target device is the verified device.

5. The method according to claim 1, wherein the device fingerprint information corresponding to the verified device is obtained by:
    acquiring a plurality of sample images using an image acquisition module of the verified device;
    extracting a residual fingerprint of each of the sample images to obtain sample image fingerprint information of the each of the sample images, and determining the device fingerprint information corresponding to the verified device according to the sample image fingerprint information of the each of the sample images; and
    storing the device fingerprint information corresponding to the verified device in the fingerprint information library.

6. The method according to claim 5, wherein the acquiring a plurality of sample images using an image acquisition module of the verified device comprises:
    obtaining a reference image, the reference image being an image with uniform solid color;
    setting an acquisition parameter of the image acquisition module of the verified device;
    photographing the reference image for a plurality of times using the image acquisition module based on the acquisition parameter to obtain a plurality of training images; and
    when the image acquisition module outputs through multiple channels, performing channel separation on each of the training images to obtain a plurality of sample images corresponding to the plurality of training images.

7. The method according to claim 5, wherein the extracting a residual fingerprint of each of the sample images to obtain sample image fingerprint information of the each of the sample images, and determining the device fingerprint information corresponding to the verified device according to the sample image fingerprint information of the each of the sample images comprises:
    performing low pass filtering on the each of the sample images, and denoising the each of the sample images to obtain a denoised sample image corresponding to the each of the sample images;
    subtracting pixels of the denoised sample image corresponding to the each of the sample images from pixels of the each of the sample images one by one to obtain a pixel difference between the each of the sample images and the denoised sample image corresponding to the each of the sample images;
    determining the sample image fingerprint information of the each of the sample images according to the pixel difference between the each of the sample images and the denoised sample image corresponding to the each of the sample images; and
    weighted-averaging the sample image fingerprint information of the each of the sample images according to a weight of the each of the sample images, to obtain the device fingerprint information corresponding to the verified device.

8. The method according to claim 1, wherein the residual fingerprint information comprises a residual fingerprint image, the device fingerprint information comprises a device fingerprint image, and the obtaining a device fingerprint component corresponding to the residual fingerprint information from the device fingerprint information according to position indication information of the face image and calculating a degree of correlation between the residual fingerprint information and the device fingerprint component comprises:
- determining a region of interest corresponding to the residual fingerprint image of the face image from the device fingerprint image according to the position indication information of the face image;
- cropping the determined region of interest from the device fingerprint image to obtain a device fingerprint sub-image; and
- calculating a degree of correlation between the residual fingerprint image and the device fingerprint sub-image.

9. An electronic device, comprising a memory and a processor, the memory storing a computer program, and the computer program, when executed by the processor, causing the electronic device to perform a face image verification method including:
- receiving a face image transmitted by a target device;
- extracting, from the face image, residual fingerprint information of the face image;
- obtaining device fingerprint information corresponding to the target device from a fingerprint information library, the device fingerprint information being the fingerprint information contained in a sample image acquired by at least one verified device associated with the fingerprint information library;
- obtaining a device fingerprint component corresponding to the residual fingerprint information from the device fingerprint information according to position indication information of the face image, and calculating a degree of correlation between the residual fingerprint information and the device fingerprint component, the position indication information of the face image being used for indicating a position of the face image within a imaging range; and
- determining that the face image passes verification when the degree of correlation is greater than or equal to a preset threshold.

10. The electronic device according to claim 9, wherein the extracting, from the face image, residual fingerprint information of the face image comprises:
- performing low pass filtering on the face image and denoising the face image to obtain a denoised face image;
- subtracting pixels of the denoised face image from pixels of the face image one by one to obtain a pixel difference between the face image and the denoised face image; and
- determining the residual fingerprint information of the face image according to the pixel difference between the face image and the denoised face image.

11. The electronic device according to claim 10, wherein the performing low pass filtering on the face image and denoising the face image to obtain a denoised face image comprises:
- performing multi-scale decomposition on the face image using wavelet transformation to obtain multi-scale sub-images;
- denoising wavelet coefficients of the multi-scale sub-images to obtain denoised sub-images; and
- reconstructing the denoised sub-images using inverse wavelet transformation to obtain the denoised face image.

12. The electronic device according to claim 9, wherein the obtaining device fingerprint information corresponding to the target device from a fingerprint information library comprises:
- obtaining a device identifier of the target device;
- determining whether the target device is the verified device according to the device identifier; and
- searching the fingerprint information library for the device fingerprint information corresponding to the device identifier when the target device is the verified device.

13. The electronic device according to claim 9, wherein the device fingerprint information corresponding to the verified device is obtained by:
- acquiring a plurality of sample images using an image acquisition module of the verified device;
- extracting a residual fingerprint of each of the sample images to obtain sample image fingerprint information of the each of the sample images, and determining the device fingerprint information corresponding to the verified device according to the sample image fingerprint information of the each of the sample images; and
- storing the device fingerprint information corresponding to the verified device in the fingerprint information library.

14. The electronic device according to claim 13, wherein the acquiring a plurality of sample images using an image acquisition module of the verified device comprises:
- obtaining a reference image, the reference image being an image with uniform solid color;
- setting an acquisition parameter of the image acquisition module of the verified device;
- photographing the reference image for a plurality of times using the image acquisition module based on the acquisition parameter to obtain a plurality of training images; and
- when the image acquisition module outputs through multiple channels, performing channel separation on each of the training images to obtain a plurality of sample images corresponding to the plurality of training images.

15. The electronic device according to claim 13, wherein the extracting a residual fingerprint of each of the sample images to obtain sample image fingerprint information of the each of the sample images, and determining the device fingerprint information corresponding to the verified device according to the sample image fingerprint information of the each of the sample images comprises:
- performing low pass filtering on the each of the sample images, and denoising the each of the sample images to obtain a denoised sample image corresponding to the each of the sample images;
- subtracting pixels of the denoised sample image corresponding to the each of the sample images from pixels of the each of the sample images one by one to obtain a pixel difference between the each of the sample images and the denoised sample image corresponding to the each of the sample images;
- determining the sample image fingerprint information of the each of the sample images according to the pixel difference between the each of the sample images and the denoised sample image corresponding to the each of the sample images; and weighted-averaging the sample image fingerprint information of the each of the sample images according to a weight of the each of the sample images, to obtain the device fingerprint information corresponding to the verified device.

16. The electronic device according to claim 9, wherein the residual fingerprint information comprises a residual fingerprint image, the device fingerprint information comprises a device fingerprint image, and the obtaining a device fingerprint component corresponding to the residual fingerprint information from the device fingerprint information according to position indication information of the face image and calculating a degree of correlation between the residual fingerprint information and the device fingerprint component comprises:
- determining a region of interest corresponding to the residual fingerprint image of the face image from the device fingerprint image according to the position indication information of the face image;
- cropping the determined region of interest from the device fingerprint image to obtain a device fingerprint sub-image; and
- calculating a degree of correlation between the residual fingerprint image and the device fingerprint sub-image.

17. A non-transitory computer-readable storage medium, the computer-readable storage medium storing a plurality of instructions, the instructions being configured to be loaded and executed by a processor of an electronic device, and causing the electronic device to perform a face image verification method including:
- receiving a face image transmitted by a target device;
- extracting, from the face image, residual fingerprint information of the face image;
- obtaining device fingerprint information corresponding to the target device from a fingerprint information library, the device fingerprint information being the fingerprint information contained in a sample image acquired by at least one verified device associated with the fingerprint information library;
- obtaining a device fingerprint component corresponding to the residual fingerprint information from the device fingerprint information according to position indication information of the face image, and calculating a degree of correlation between the residual fingerprint information and the device fingerprint component, the position indication information of the face image being used for indicating a position of the face image within a imaging range; and
- determining that the face image passes verification when the degree of correlation is greater than or equal to a preset threshold.

18. The non-transitory computer-readable storage medium according to claim 17, wherein the extracting, from the face image, residual fingerprint information of the face image comprises:
- performing low pass filtering on the face image and denoising the face image to obtain a denoised face image;
- subtracting pixels of the denoised face image from pixels of the face image one by one to obtain a pixel difference between the face image and the denoised face image; and
- determining the residual fingerprint information of the face image according to the pixel difference between the face image and the denoised face image.

19. The non-transitory computer-readable storage medium according to claim 17, wherein the device fingerprint information corresponding to the verified device is obtained by:
- acquiring a plurality of sample images using an image acquisition module of the verified device;
- extracting a residual fingerprint of each of the sample images to obtain sample image fingerprint information of the each of the sample images, and determining the device fingerprint information corresponding to the verified device according to the sample image fingerprint information of the each of the sample images; and
- storing the device fingerprint information corresponding to the verified device in the fingerprint information library.

20. The non-transitory computer-readable storage medium according to claim 17, wherein the residual fingerprint information comprises a residual fingerprint image, the device fingerprint information comprises a device fingerprint image, and the obtaining a device fingerprint component corresponding to the residual fingerprint information from the device fingerprint information according to position indication information of the face image and calculating a degree of correlation between the residual fingerprint information and the device fingerprint component comprises:
- determining a region of interest corresponding to the residual fingerprint image of the face image from the device fingerprint image according to the position indication information of the face image;
- cropping the determined region of interest from the device fingerprint image to obtain a device fingerprint sub-image; and
- calculating a degree of correlation between the residual fingerprint image and the device fingerprint sub-image.

* * * * *